March 3, 1964  T. A. SCHAAD ETAL  3,122,829
METHOD OF ASSEMBLING A COIL SPRING SEAT CUSHION
Filed Sept. 13, 1960  2 Sheets-Sheet 1

INVENTORS
BY Theodore A. Schaad,
& Paul Widmer
C. P. Barnard
ATTORNEY

INVENTORS
BY Theodore A. Schaad,
& Paul Widmer
ATTORNEY

United States Patent Office 3,122,829
Patented Mar. 3, 1964

3,122,829
METHOD OF ASSEMBLING A COIL SPRING
SEAT CUSHION
Theodore A. Schaad, Bloomfield Hills, and Paul Widmer, Detroit, Mich., assignors to General Motors Corporation, Detroit, Mich., a corporation of Delaware
Filed Sept. 13, 1960, Ser. No. 55,776
3 Claims. (Cl. 29—436)

This invention relates to a method of assembling a coil spring seat cushion assembly.

The coil springs of seat cushion assemblies are conventionally assembled by crimping the lower ends of the coil springs to a support pan by the use of special hand tools. The upper ends of the coil springs are tied together by a plurality of support and tie wires extending between a rim member. In this manner a plurality of coil springs are attached to the separator pan by hand tools and then the tops of the coil springs are manually interconnected to provide the completed assembly. Obviously, considerable time is required for the assembly of each individual unit. In addition, uniformity of spring action depends upon the skill of the assembler.

An object of this invention is to provide a method of assembling a unitary coil spring assembly which requires a minimum of manual assembly operations. A further object of this invention is to provide a method of assembling a coil spring assembly having a minimum number of parts and being exceptionally sturdy and durable in use. Still another object of this invention is to provide a method of automatically assembling the principal parts of a coil spring assembly.

Other objects and advantages are disclosed in the following detailed description, wherein reference is made to the accompanying drawings in which.

Figure 1:
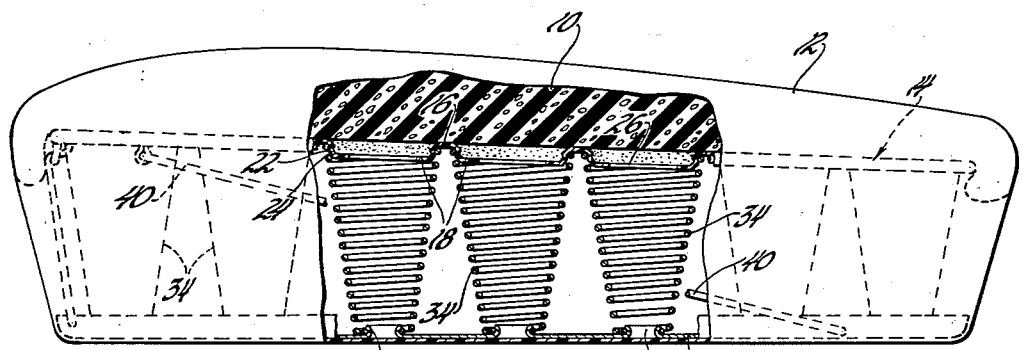
FIGURE 1 is a side elevational view, partly in section of a seat cushion assembly embodying the present invention.
Figure 2:
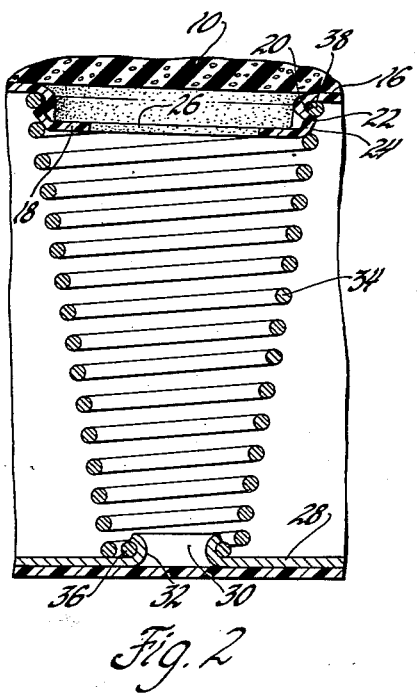
FIGURE 2 is an enlarged partial view of a portion of the assembly illustrated in FIGURE 1.

Referring now to FIGURES 1 and 2, a seat cushion coil spring assembly embodying the present invention is shown to comprise a seat cushion 10 of plastic or other suitable material, a cover 12 and a coil spring assembly unit 14. The coil spring assembly unit comprises a semi-rigid plastic separator pan 16 having a plurality of integrally formed, downwardly extending boss portions 18. Each of the boss portions 18 is provided with a peripheral groove 20, a separating detent ridge 22 and a lower inclined or conical surface 24 for a purpose to be hereinafter described. In addition, each of the boss portions 18 is provided with a central aperture 26.

A support pan 28 made of metal or other suitable material is provided with a plurality of apertures 30 which are axially aligned with the apertures 26 in the separator pan 16 and have upwardly turned rim portions 32 which are adapted to seat and retain the lower end of conical compression springs 34. The rim portions 32 are crimped or bent over the lower coil 36 of the conical compression springs to secure the springs in place. The upper coil 38 of the conical compression springs is seated within the groove 20 provided on each of the bosses 18. The separator pan is made of a semi-rigid plastic material which has sufficient resiliency to allow the boss portions 18 to be snapped into position within the compression springs to seat the upper coil 38 in the groove 20.

The internal construction of the coil spring assembly is maintained in spaced relationship without the use of any clips or wires solely by the support pan and the separator pan. However, tie wires 40 may be provided, if necessary, only to prevent lateral shifting of the assembly. The conical coil compression springs are mounted to taper downwardly and inwardly for a purpose to be hereinafter described.

Figure 3:
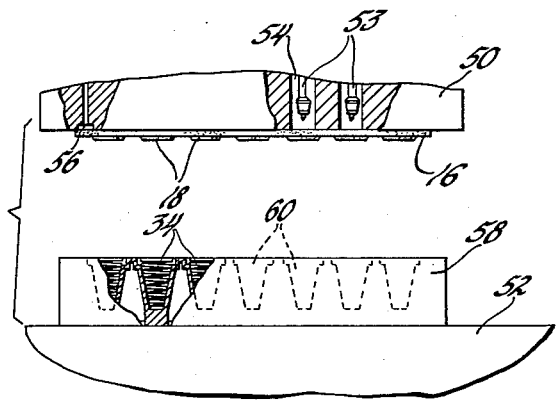
FIGURE 3 is a side elevational view, partly in section, of assembly apparatus embodying the present invention.

Referring now to FIGURES 3–9, a method and apparatus for automatically assembling the aforedescribed seat cushion coil spring assembly is hereinafter described. The apparatus for automatically assembling the coil spring unit is shown in FIGURE 3 and comprises a press 50 which is reciprocably mounted relative to a base platen 52 in a conventional manner. The press 50 has a plurality of crimping pins 53 reciprocably mounted therein and relative thereto within a plurality of guide holes 54 which are spaced and aligned to conform to the spacing and alignment of the apertures 26 in the separator pan 16. Suitable clamping means, such as a plurality of vacuum ports 56, are provided around the periphery of the crimping pins 53 to releasably secure the separator pan 16 to the underside of the press 50. Any suitable locating means (not shown) may be used to locate the separator pan relative to the press 50 so that the apertures 26 are in axial alignment with the pins 53. As shown in detail in FIGURE 9, the platen 52 is provided with a plurality of holes 57 which are axially aligned with the crimping pins 53 for a purpose to be hereinafter described.

Figure 5:
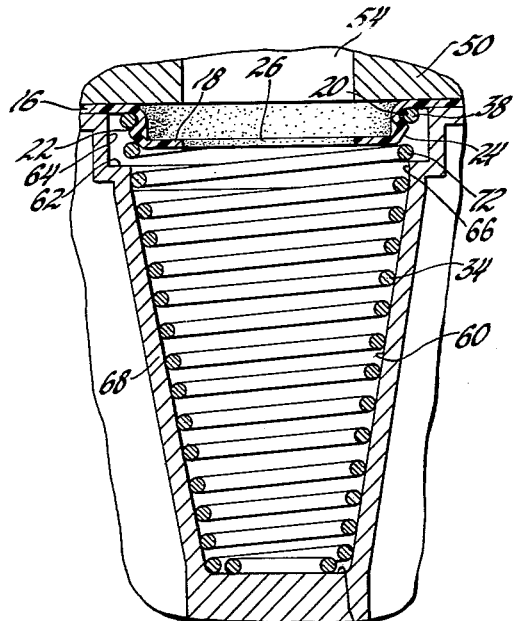
FIGURE 5 is an enlarged partial sectional view of the assembly apparatus in the position shown in FIGURE 4.

A special fixture 58 is provided to hold the individual conical coil springs prior to assembly and comprises a plurality of conical spring cavities 60 which are spaced and aligned in a pattern corresponding to the final assembled position of the coil springs. As shown in FIGURE 5, each of the cavities 60 is provided with a seat or shoulder 62 adjacent the opening thereof which is formed by concentric counterbores 64, 66 for a purpose to be hereinafter described. The counterbore 66 terminates in a conically extending portion 68 which, in turn, terminates in a transverse floor or seat 70. The conical tapered portion 68 is dimensioned to receive the conical coiled springs 34 in substantially interfacial engagement therewith. The shoulder 62 extends radially inwardly a sufficient distance to catch the second or third coil 72 of the conical coiled springs and prevents downward depression thereof. In this manner the inside diameter of the shoulder 62 is less than the outside diameter of the portion of the conical coil springs circumjacent thereto. Suitable conventional locating means (not shown) are provided on the lower platen 52 to position the fixture 58 so that the spring cavities 60 are in axial alignment with the crimping pins 53 and the bosses 18 of the separator pan 16.

Figure 9:
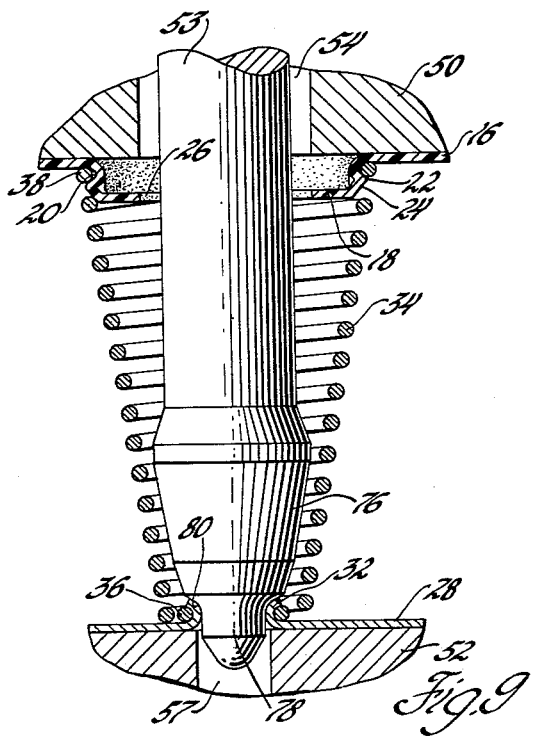
FIGURE 9 is a partial cross-sectional view of the assembly apparatus in the position shown in FIGURE 8.

Referring now to FIGURE 9, the crimping pins 53 comprise a conically tapered head portion 76 which terminates in a reduced cylindrical section 78 to provide a forming shoulder 80. The diameter of the cylindrical portion 78 is sufficiently smaller than the apertures 30 in the support pan 28 to permit movement of the cylindrical portion therethrough and into the holes 57 provided in the platen 52. In this manner the rim portions 32 may be crimped or bent from their original upstanding position, as shown in FIGURE 7, to a position in securing engagement with the lower coil 36 of the conical spring members 34.

Referring now to FIGURE 3, the first portion of the assembly process comprises the steps of positioning the plastic separator pan 16 beneath the press 50 so that the separator pan holes 26 are axially aligned with the crimping pins 53. The separator pan 16 is then clamped by vacuum means 56 or any other suitable clamping device to the lower surface of the press 50. The individual conical coil springs 34 are next positioned within the conical cavities 60 of the spring holding fixture 58. The fixture is then located beneath the press 50 on the platen 52 so that the springs 34 in the cavity 60 are axially aligned with the crimping pins 53 and the boss portion 18 of the separator pan 16.

Figure 4:
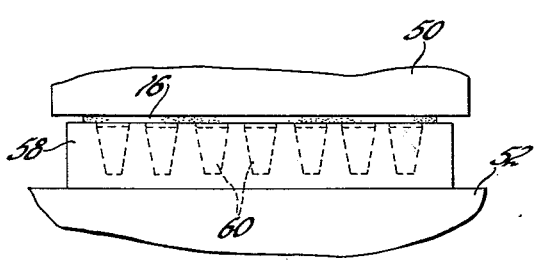
FIGURE 4 is a side elevational view of the apparatus shown in in FIGURE 3, illustrating one of the steps of assembly of the apparatus illustrated in FIGURE 1.

Referring now to FIGURES 4 and 5, the next portion of the assembly process comprises the steps of closing the press 50 and moving the separator pan 16 downwardly into engagement with the spring holding fixture 58. The boss portions 18 of the separator pan are thereby moved into the counterbores 64 of the spring cavities 60 and are forced downwardly within the conical compression springs 34. Movement of the conical compression springs downwardly within the spring cavity 60 is limited by engagement of one of the spring coils 72 with the shoulders or seats 62. Further movement of the separator pan 16 into engagement with the top surface of the spring holding fixture 58 causes the semi-rigid boss portions 18 to be snapped into a position within the coil springs whereat the upper coils 38 are seated within the peripheral grooves 20 so that the ridges 22 prevent downward displacement of the coil springs relative to the separator pan. The tapered or conical surfaces 24 of the boss portions 18 facilitate upward movement of the upper coils 38 into position in the grooves 20.

Figure 6:
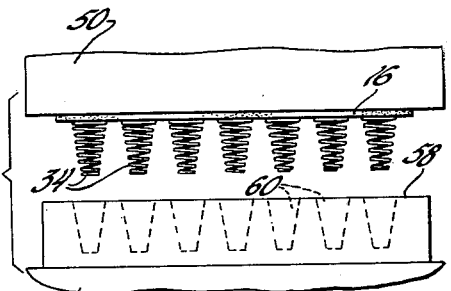
FIGURE 6 is a side elevational view of another portion of the assembly process.
Figure 7:
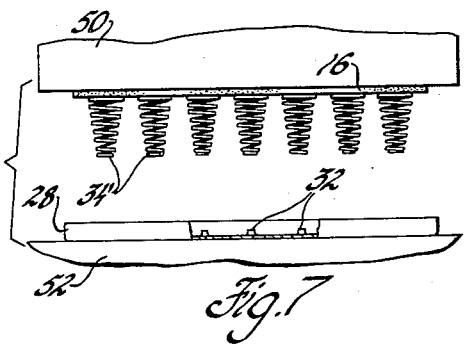
FIGURE 7 is a side elevational view, partly in section, of still another portion of the assembly process.

Referring now to FIGURES 6 and 7, another portion of the assembling process is shown to comprise the steps of opening the press after the separator pan boss portions have been snapped into retaining engagement with the coil springs in the coil spring holder 58. When the press 50 is moved upwardly, the clamping means 56 provided thereon carries the plastic separator plate 16 and the conical coil springs 34 attached thereto upwardly out of engagement with the coil spring holder 58. The coil spring holder 58 is then removed from the lower platen 52 by any suitable mechanism, and a support pan 28 is positioned on the lower platen 52 with the apertures 30 in axial alignment with the coil springs 34, the locating pins 53, and the holes 57 in the lower platen 52.

Figure 8:
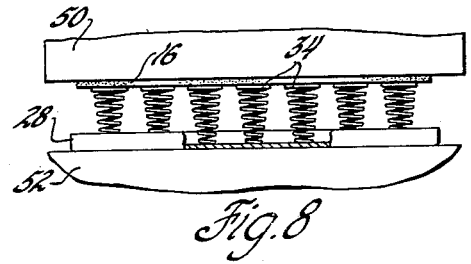
FIGURE 8 is a side elevational view, partly in section, of a further portion of the assembly process.

The final portion of the assembling process is shown in FIGURES 8 and 9, and comprises the steps of again lowering the press 50 to move the separator pan 16 and the conical coil springs attached thereto into engagement with the support pan 28. The lower coil 36 of the springs 34 is positioned circumjacent the rim portion 32 of the support pan 28. The press 50 continues downwardly a suitable distance after the lower coils 36 are positioned in engagement with the support pan 28 to suitably tension the components. Then the crimping pins 53 are moved downwardly in the retaining holes 54 relative to the press 50 until the forming seat 80 engages the rim portions 32 and forces the rim portions radially outwardly over the lower coil 36. The crimping pins are moved downwardly until the support pan 28 is securely fastened to the lower coils 36. The downward movement of the crimping pins 53 is accommodated by the holes 57 provided in the lower platen 52. The clamping means 56 are released and the press 50 is raised. Then the unitary coil spring assembly comprising the separator pan 16, the conical coil springs 34 and the support plate 28 is moved from the press by any suitable conventional means.

The unitized coil spring assembly may be thereafter moved to assembly area or stored. The unit is sufficiently secured so that normal handling in transit or storage will not separate the component parts. The seat cushion assembly is completed by securing the seat cushion 10 to the separator pan 16 and securing a cover 12 therearound by suitable tie wires 40 and other conventional fastening devices.

The invention is not intended to be limited to the details of construction of the illustrated preferred embodiment which are susceptible of changes and modifications within the scope of the appended claims.

The invention claimed is:

1. A method of manufacturing a unitary coil spring assembly having a unitary separator pan, a unitary support pan, and a plurality of individual coil springs secured therebetween, and comprising the steps of: moving a separator pan into a press, the upper portion of said press having a plurality of crimping pins spaced thereon, aligning through holes in a plurality of fastening means provided on said separator pan with the crimping pins and securing said separator pan in fixed relation to the upper portion of the press by suitable clamping means, moving a spring-locating fixture into the press and thereby positioning a plurality of individual coil springs carried thereby beneath said separator pan and in alignment with the through holes therein, engaging adjacent surfaces of the separator pan and the fixture and simultaneously forcing each of the individual coil springs into fastened engagement with said plurality of fastening means on said separator pan, disengaging the separator pan from the fixture and carrying the individual coil springs therewith from said fixture, removing the empty spring-locating fixture from the press and feeding a support pan into the press and into alignment with said individual coil springs carried by said separator pan, moving said separator pan and engaging each of said individual coil springs with each of a plurality of crimpable fastening means provided on said support pan, and simultaneously crimping each of said fastening means to each of said individual springs carried by said separator pan by means of said spaced crimping pins on the upper portion of the press.

2. A method of manufacturing a unitary coil spring assembly having a unitary separator pan, a unitary support pan, and a plurality of individual coil springs secured therebetween, and comprising the steps of: positioning said individual coil springs in alignment with individual fastening means provided on one of the pans, simultaneously securing and fastening each of the individual coil springs to the associated individual fastening means provided on the one pan, moving said one pan and said individual coiled springs into alignment with individual fastening means provided on the other of the pans for each of said individual coil springs, and simultaneously securing and retaining each of said individual coil springs with said individual fastening means provided on the other of said pans.

3. A method of manufacturing a unitary coil spring assembly having a unitary separator pan, a unitary support pan, and a plurality of individual coil springs secured therebetween, and comprising the steps of: positioning said plurality of individual coil springs in axial alignment with individual frictional fastening means provided on said separator pan, forcing each of said individual fastening means on said separator pan into simultaneous engagement with one end of each of said individual coil springs, restraining movement of each of said coil springs in response to engagement of said separator pan therewith to cause frictional retaining engagement between said coil springs and said fastening means, and thereafter simultaneously securing the other ends of said coil springs to said support pan to form said unitary coil spring assembly.

References Cited in the file of this patent
UNITED STATES PATENTS

| | | |
|---|---|---|
| 1,333,801 | Fitzgerald | Mar. 16, 1920 |
| 1,585,279 | Brandberg | May 18, 1926 |
| 1,591,281 | Carroll | July 6, 1926 |
| 1,773,410 | Selah | Aug. 19, 1930 |
| 1,885,443 | Holt | Nov. 1, 1932 |
| 2,084,411 | Robarge | June 22, 1937 |
| 2,298,433 | Throop | Oct. 13, 1942 |
| 2,518,867 | Clary | Aug. 15, 1950 |
| 2,829,488 | Valli | Apr. 8, 1958 |